United States Patent Office 2,898,320
Patented Aug. 4, 1959

2,898,320

PROCESS FOR CONDITIONING SOIL WITH A POLYMER CONTAINING N-METHYLOL SUBSTITUENTS

George Sidney Sprague, Stamford, Conn., and Henry Z. Friedlander, Scarsdale, N.Y., assignors to American Cyanamid Company, New York, N.Y., a corporation of Maine No Drawing. Application May 21, 1953
Serial No. 356,581

7 Claims. (Cl. 260—41)

The present invention relates to a method of aggregating soil particles.

Within recent years it has been discovered that soil particles could be aggregated by treating the soil with various polyelectrolytes. Many beneficial results have accrued from this treatment of soil as the physical structure is improved by binding together large numbers of earth particles into clusters or crumb-like granules. Among these are prolonged improvements in tilth or workability, water absorptivity or holding capacity, aeration and other attendant benefits for a wide range of soils including silt-loam and compacted clay. When a good soil conditioner is applied in proper manner as a solution of the agent onto tilled soil or by mixing loose soil and a powdered agent, a granular porous soil structure results which does not readily break down under the influence of rainfall or watering. Since the treated soils show little or no tendency to cake or form surface crusts under heavy rainfall, one of the principal current uses of such treatments is minimizing or preventing erosion on inclined bare surfaces or banks of soils predominant in clays. It must not be presumed that all soil conditioners are equally effective for it has been found varying quantities of different agents are required to produce the same effect. In view of this there is a continuing demand for improved soil conditioning methods and especially for methods which permit a reduction in the quantity of soil conditioning agent applied, for even the best of the current treatments are considered rather expensive for large scale agriculture.

An object of the invention is to provide an improved method for aggregating soil particles.

Another object of the invention is to provide a method for improving the physical structure of soils.

A further object of the invention is to provide a more efficient soil conditioning treatment.

Other objects and advantages of the invention will be apparent to those skilled in the art especially upon consideration of the accompanying detailed disclosure. Unless otherwise specified, all proportions are set forth in terms of weight.

The objects and advantages of the present invention are obtained by treating soil with a polymer containing an N-methylol amide radical. In a narrower aspect, the invention is concerned with the application of a water-dispersible essentially linear polymer having a weight average molecular weight of at least about 2,500 with an N-methylol amide radical attached to at least about 5 percent of the carbon atoms in the linked carbon chain of the polymer; the polymer preferably being either a homopolymer or a copolymer of methylol acrylamide.

Although the prior art has indicated that soil can be aggregated successfully only with certain compounds which are polyelectrolytes, it has been discovered according to the present invention that another group of materials including many nonionic polymers or copolymers will also condition soil. Some of the latter are apparently far more efficient in aggregating soil than any of the highly polar materials of the prior art on at least certain types of arable soils. The polymers of the present invention have recurring substituents of the formula—CONHCH$_2$OH, that is N-methylol amide radicals, attached directly to some of the atoms in the carbon-to-carbon chains of the polymer molecules. These radicals should be attached to at least about 5 out of every 100 atoms in said carbon chains and preferably to 40 percent or more of the carbon atoms. Such polymers are essentially linear and their molecular weight should be at least about 2,500 on a weight average basis inasmuch as materials of a lower degree of polymerization will not cohere the soil particles to the desired extent; polymers with molecular weights above 10,000 are preferred as they are believed considerably more effective. There does not appear to be any upper limit to the molecular weight so long as the polymer is water-dispersible even if a dispersing or emulsifying agent is required for the purpose. Of course, water-soluble materials are greatly preferred, but any water-dispersible polymer of the class disclosed may be employed to accomplish at least some of the benefits of this invention. In general, the higher the molecular weight the greater the soil conditioning efficiency. Accordingly, water-dispersible polymers of the type described above are within the scope of the present invention regardless of whether their molecular weight is 50,000 or 500,000 or even 5,000,000 or more. In the case of polymethylol acrylamide, homopolymers of all molecular weights have sufficient solubility in water to form the dilute aqueous solutions which are employed in the preferred method of application by spraying. Where the solid polymer is found to be difficult to dissolve, especially by reason of the agglomeration of particles or the formation of a gel on the surface of the particles, flaking may facilitate dissolving the substance in water. Flakes between about 40 and about 600 microns in thickness and capable of passing through a 4-mesh screen are contemplated for this purpose.

In producing a polymer having N-methylol amide substituents on the carbon chain, the use of methylol acrylamides is recommended as these compounds are well known in the art and may be prepared by the reaction of acrylamide or an acrylamide compound having the formula:

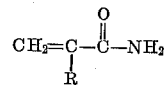

wherein R is a radical selected from the group consisting of hydrogen and methyl, with formaldehyde or a compound engendering formaldehyde such as paraformaldehyde, trioxane, etc., to produce a final polymer or copolymer which is water-soluble or water-dispersible. Methylol acrylamide and methylol methacrylamide are preferred for this purpose. The ratio of ingredients employed in preparing a compound of the above formula may be varied considerably within certain limits. Sufficient formaldehyde should be employed to methylolate at least about 5 percent of the amide radicals in the final polymer. When using an acrylamide or substituted acrylamide of the above structural formula, the maximum quantity of formaldehyde that can react therewith is only 1 mol per mol of the amide. An excess of formaldehyde, say up to 3 mols per mol of amide, may sometimes prove beneficial in driving the methylolation reaction toward completion but a large excess is wasteful and may even be detrimental if not removed.

The reaction between the amide and the aldehyde is advantageously accomplished in the presence of a suitable catalyst such as potassium carbonate, triethanol amine, sodium phosphate, sodium hydroxide or triethylamine by simply mixing together aqueous solutions of the compound and the catalyst in the desired proportions under alkaline conditions, preferably at a pH of from 8 to 12. Although not necessary, a mild heating is usually desirable to expedite the reaction and temperatures between 15° and 80° C. are recommended. When a monomeric amide is used as the starting material, the product will be a monomeric N-methylol amide of an acrylic acid.

In forming the water-soluble or water-miscible polymers described herein, polymerization in inert solvent media is recommended; for example, in water or aqueous alcohol solutions. Among the suitable alcohols are methyl, ethyl, propyl, isopropyl and tertiary butyl alcohols. Increasing the concentration of alcohol in the solution decreases the molecular weight of the polymer; thus, the highest molecular weight polymers are obtained in polymerization systems where water alone is employed as the medium. The preferred polymerization catalysts are water-soluble peroxy compounds including hydrogen peroxide, potassium persulfate, sodium perborate and the like. The reaction may take place under either alkaline or acid conditions, preferably at a pH of between 2 and 11, in the presence of between 0.1 and 5.0 percent by weight of the catalyst. If necessary, an emulsifying agent may be employed to assure intimate contact between the catalyst and a comonomer of relatively low solubility such as ethyl acrylate. Examples of dispersing agents which may be used are diamyl, dihexyl or dioctyl sulfo-succinic esters and salts thereof, salts of alkylated napthalene sulfonic acids, sodium lauryl sulfate and other sulfonated and sulfated higher fatty alcohols, alkali metal soaps and equivalent emulsifiers in amounts ranging from about 1 to about 5 percent by weight of the monomer. The amount of water or alcohol-water solution to be employed as a medium of polymerization or copolymerization is not critical and is capable of wide variations. As little as 50 percent of solvent based on total weight of solvent and reactants may be used. While there is no actual limitation to the upper limit of water content used, this as a practical matter is governed by the desired characteristics of the polymer to be produced. The optimum amount of water depends on a number of things including the nature of the polymer, the extent of exothermic heat of reaction and the degree of polymerization.

It is a matter of choice as to whether the amide should be polymerized before or after methylolation. For example, acrylamide may be polymerized and then reacted with formaldehyde to produce a methylol acrylamide polymer which is indistinguishable from a product obtained by first reacting monomeric acrylamide with formaldehyde and thereafter polymerizing the monomeric methylol acrylamide. The expression polymethylol acrylamide is used herein to include polymers prepared by either method.

The polymerization of methylol acrylamide may be carried out in the following manner. Two hundred and twenty-five grams of demineralized water, buffered to a pH of 5.75 with potassium acetate and acetic acid, is placed in a one-liter, three-necked flask provided with a stirrer and a condenser. The solution is then warmed slowly to 50° C. during which time nitrogen is continously introduced so as to bubble through the solution and sweep the flask and its contents free of oxygen or air. At this point there is added 25 grams of solid crystalline methylol acrylamide, 0.500 gram of ammonium persulfate and 1.5 grams of isopropanol. The temperature of the mixture is raised to 60° C. and held there for 2 hours during which time the mixture is continuously stirred and the flask and its contents purged with nitrogen. The resulting polymeric solution, cooled to room temperature and pH adjusted to 7.5 with sodium hydroxide, has a Brookfield viscosity of 2,650 centipoises and a molecular weight as determined osmometrically of 60,000±500.

This addition polymer is made up of chains of linked carbon atoms with single —$CONHCH_2OH$ radicals attached to substantially alternate carbon atoms in each chain. In other words, about 50 percent of the carbon atoms in each chain are connected to the methylolamide groups. The proportions of these radicals may be increased or decreased by copolymerization as described below or reduced by decreasing the quantity of formaldehyde in the methylolation reaction to less than stoichiometric proportions.

The polymers used in the process of the present invention may be modified by the introduction of any additional ethenoid type monomers having a terminal $CH_2=C<$ group or maleic acid derivatives by copolymerization under the conditions set forth above. Among the co-monomers which may be employed are the acrylamides and the methylol acrylamides described previously, alkyl acrylates and methacrylates such as ethyl acrylate, methyl methacrylate, acrylonitrile methacrylonitrile, maleic dimethylolamide, maleic diamide, maleic anhydride, maleic acid, styrene and substituted styrenes such as alpha methyl styrene, para-methyl styrene, 2,4-dimethyl styrene, ortho-, meta-, and para-chlorostyrenes, 2,4- dibromo styrenes, vinyl chloride, vinyl esters preferably of the lower fatty acids such as acetic acid, propionic acid, butyric acid, and vinyl ethers such as methyl vinyl ether, vinylidene cyanide, and the like. Three or more monomers may be copolymerized if desired. Thus, an extremely large range of monomers or comonomers may be used in the addition or vinyl type polymerization since the present process is concerned with polymeric agents having carbon chains bearing recurring —$CONHCH_2OH$ radicals as substituents regardless of the manner of preparation or the starting materials. A wide variety of other substituents may also be present provided that they do not render the polymer too insoluble to be dispersible in water.

In preparing polymers containing a number of N-methylol amide radicals greater than 50 percent of the number of atoms in the carbon chains other methods must be employed. Among these are copolymerization with a maleic acid derivative. For example, a 1:1 copolymer of maleic diamide and acrylamide, prepared by peracetic acid-catalyzed copolymerization at 50° C. in dioxane solution and having a specific viscosity of 2.5 as a 1 percent solution in water by weight, is methylolated by the following procedure:

Five parts by weight of the polymer dissolved in 62 parts of water is treated with 7.25 parts (1.1 equivalents) of 36.9 percent aqueous formaldehyde and enough sodium hydroxide to raise the pH to 10. After standing overnight at room temperature, the pH is reduced to 8.5 by the addition of dilute hydrochloric acid.

In evaluating the various polymers as to their soil aggregating power, an arbitrary method of aggregate analysis is used herein. This method is based on the procedure reported by R. E. Yoder as "A Direct Method of Aggregate Analysis of Soils and a Study of the Physical Nature of Erosion Losses" in the Jour. Amer. Soc. Agron., 28:337–350 (1936). The modified analysis is carried out as follows:

(1) Silt-loam was selected as the standard soil and a sample is prepared by grinding in a Fitch mill and classified by passing through a 60-mesh screen, the oversize particles being discarded.

(2) Forty grams of soil in a beaker is treated with a sample of the soil conditioner by adding 0.1 percent of conditioner carried in sufficient water to add 25 percent moisture based on the weight of the soil. For example: 10 milliliters of a 0.4 percent solution are added to a 40-gram sample of soil.

(3) The sample is then thoroughly mixed with a spatula to help the formation of aggregates and is then spread out on a flat surface and air-dried overnight. Soil treated only with water is run as a check.

(4) The air-dry samples are put through a 5-mesh sieve with gentle pressure if necessary, then wet sieved for 30 minutes in mechanical equipment which raises and lowers the sieve nest 35 times a minute in water through a stroke length of 0.75 inch. The nest of sieves consists of a 40, 60 and 140-mesh with 0.42, 0.25 and 0.105 millimeter openings, respectively. Upon completion of the wet sieving, the water is drained off, the nest of sieves placed on a hot plate for preliminary drying. Each size fraction of aggregates is then place in moisture cans, dried at 105° C., cooled and weighed.

(5) It is found that a gross total aggregation figure affords sufficient precision for determining soil aggregating performance. This figure may be readily determined by dividing the total dry material remaining on the three sieves by the weight of the original sample and multiplying by 100 to convert the fraction to percent. For the present purposes, an analysis of material remaining on each sieve is not necessary. The standard untreated soil when wet-sieved as a control is found to yield an aggregation percentage ranging from 5 to 6 percent. This should be subtracted from the gross percent of aggregates where a net figure is desired or necessary.

For a better understanding of the present invention, reference should be had to the specific examples tabulated below. It is to be understood that these examples are illustrative and not to be construed in a limiting sense.

physical structure for agricultural purposes than one composed almost entirely of clays as the latter have a strong tendency to cake and crust. The principal benefits of soil conditioning result from changing crusty soil surfaces into small loose crumbly soil aggregates which are readily penetrated by water or moisture. To achieve this desired state, little or no change is required in the structure of the sandy soil compared to the clay; hence, a light treatment at the most is adequate for the sandy soil and a heavy treatment is indicated for the clay soil.

From 10 to 2,000 pounds of the polymer per acre of soil are customarily employed in the process of the present invention. Larger quantities may be used but are wasteful unless the soil is being treated to a considerable depth. In most cases a treatment with between 100 and 400 pounds of the polymer per acre is recommended, and the depth of treatment in the soil may range from about one-quarter inch to about 6 inches. Setting forth the recommended proportions on another basis, it is desirable to uniformly mix a quantity of the polymer ranging between about 0.001 and about 2.0 percent of the polymer based on the weight of the dry soil to be treated and the best results, with due consideration for economy, are customarily obtained with mixtures containing between 0.01 and 0.2 percent

*Examples*

| Example | Polymer | Molar Ratio of Comonomers | Viscosity, c.p.s. | Gross Percent Water Stable Aggregates Greater Than 0.105 mm. | | |
|---|---|---|---|---|---|---|
| | | | | First | Second | Average |
| A | Acrylamide | | 7,480 | 36.2 | 33.9 | 35.0 |
| 1 | Methylolacrylamide [1] | | 2,650 | 85.5 | 85.1 | 85.3 |
| 2 | do | | 54,000 | 87.7 | 89.7 | 88.7 |
| 3 | Methylolacrylamide-ethyl acrylate | 80:20 | | 69.6 | 71.5 | 70.5 |
| 4 | do | 50:50 | | 53.7 | 52.6 | 53.1 |
| 5 | Methylolacrylamide-QAB [2] | 50:50 | | 30.1 | 30.5 | 30.3 |
| 6 | Half-methylolated acrylamide | | | 46.0 | 46.6 | 46.3 |
| 7 | Methylolated acrylamide plus 100% excess HCHO | | | 88.6 | 88.6 | 88.6 |
| 8 | Methylated acrylamide-maleic diamide | 50:50 | | | | high |

[1] 60,000±500 number average molecular weight.
[2] Acrylamidopropyl benzyl dimethyl ammonium chloride

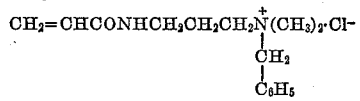

Example A above does not form any part of the present invention and is set forth for purposes of comparison. When the performance of polyacrylamide is contrasted with the polymethylol acrylamide employed in Examples 1 and 2, it will be noted that conversion of the amide group into a methylol amide radical has a tremendous and unpredictable effect on the soil conditioning qualities of the polymer. The reason for the improved soil aggregating is not understood at present. It is also apparent that the methylol amide content of the polymer has a profound influence on its soil aggregating power and this appears to be true regardless of whether the methylol amide content is varied by copolymerization or by altering of the quantity of formaldehyde employed for methylolation. A comparison of Example 7 with 1 and 2 indicates that the effect is due to methylol amide radicals and not merely to an excess of formaldehyde.

The expression "soil" is used in a general sense herein to refer to the various sands, clays, silts and loams in various parts of the earth. Thus, the invention is not limited to treatment of the particular silt-loam soil used in the test described above to facilitate comparison by eliminating soil variations. It should be understood that the amount of soil conditioning agent applied will vary considerably with the particular type of soil. For instance, a soil of proper sand content has a far better by weight of the soil conditioning polymers described herein.

For liquid application a dilute aqueous solution of the polymer disclosed herein is recommended, as for instance one containing about 0.2 to 2.0 percent polymer by weight. In utilizing such solutions, it should be borne in mind that they seldom penetrate beyond about one-half to three-quarters inch even in soil which has been properly tilled and broken up into comparatively small particles. In treating soil to a greater depth, the easiest method of treatment consists of mixing the dry powdered agent with the soil by raking, disking, harrowing or any other suitable method of distributing a dry material through the upper layer of soil. Application in liquid form is usually less desirable for relatively deep treatments as it requires greater manipulation or handling of the soil. One method of accomplishing this is to drench the prepared loose soil with a 0.5 percent aqueous solution of the polymer; then after the soil has dried, to rake the surface in order to bury the treated soil; and to treat the new surface with additional polymer solution. This procedure may be repeated as often as necessary.

Since certain changes and alterations may be made in carrying out the above process without departing from the scope of this invention, it is intended that all matter contained in the above description shall be interpreted as illus-

We claim:

1. A process for conditioning soil comprising admixing said soil with a non-electrolyte, water-soluble, polymerized material having a weight average molecular weight of at least 2,500, said polymerized material being selected from the group consisting of the polymerization product of a polymerizable monomer containing a $CH_2=C<$ group, maleic dimethylol amide, maleic diamide and maleic anhydride, said polymerized material containing methylol amide radicals attached to at least 5% of the carbon atoms in the polymer chain composed of linked carbon atoms, thereby forming a porous soil structure of non-caking, discrete particles which are readily penetrable by water but resistant to erosion.

2. A process for conditioning soil comprising admixing said soil with polymethylol acrylamide, a water-soluble non-electrolyte, having a weight average molecular weight of at least 2,500 and containing methylol amide radicals attached to at least 5% of the carbon atoms in the polymer chain composed of linked carbon atoms, thereby forming a porous soil structure of non-caking, discrete particles which are readily penetrable by water but resistant to erosion.

3. A process according to claim 1 in which the polymer is polymethylol methacrylamide.

4. A process according to claim 1 in which the polymer is a copolymer of an amide derivative of an acrylic acid and a copolymerizable ethenoid monomer.

5. A process according to claim 1 in which the polymer is a copolymer of methylol amide derivatives of maleic acid and an acrylic acid.

6. A process according to claim 1 in which the soil surface is treated by intimately admixing between 0.00001 and 0.02 pound of the polymer per pound of soil being treated.

7. A process according to claim 1 in which the soil surface is treated intimately admixing between 0.0001 and 0.002 pound of the polymer per pound of soil being treated.

References Cited in the file of this patent

UNITED STATES PATENTS

| | | |
|---|---|---|
| 2,173,005 | Strain | Sept. 12, 1939 |
| 2,314,181 | Winterkorn | Mar. 16, 1943 |
| 2,492,212 | Dailey | Dec. 27, 1949 |
| 2,541,005 | Oldham et al. | Feb. 6, 1951 |
| 2,598,663 | Kropa | June 3, 1952 |
| 2,616,818 | Azorlosa | Nov. 4, 1952 |
| 2,625,529 | Hedrick et al. | Jan. 13, 1953 |

FOREIGN PATENTS

| | | |
|---|---|---|
| 482,897 | Great Britain | Apr. 7, 1938 |
| 501,726 | Belgium | May 7, 1951 |

OTHER REFERENCES

The Washington Post, page 3, column 8, October 19, 1950.